United States Patent

Sasakawa et al.

(10) Patent No.: US 7,633,632 B2
(45) Date of Patent: Dec. 15, 2009

(54) LASER MEASUREMENT DEVICE AND LASER MEASUREMENT METHOD

(75) Inventors: Tadashi Sasakawa, Kawasaki (JP); Yoshifumi Natsume, Tokyo (JP); Nobuyasu Teraoka, Yokohama (JP); Toshikazu Asanuma, Hino (JP)

(73) Assignee: Pasco Corporation, Tokyo (JP)

( * ) Notice: Subject to any disclaimer, the term of this patent is extended or adjusted under 35 U.S.C. 154(b) by 163 days.

(21) Appl. No.: 11/990,992

(22) PCT Filed: Aug. 25, 2006

(86) PCT No.: PCT/JP2006/316723

§ 371 (c)(1),
(2), (4) Date: Feb. 26, 2008

(87) PCT Pub. No.: WO2007/026613

PCT Pub. Date: Mar. 8, 2007

(65) Prior Publication Data

US 2009/0161116 A1    Jun. 25, 2009

(30) Foreign Application Priority Data

Aug. 31, 2005   (JP)   ............................. 2005-251748

(51) Int. Cl.
   *G01B 11/30*   (2006.01)
   *G01B 11/24*   (2006.01)
(52) U.S. Cl. ...................... 356/601; 356/612
(58) Field of Classification Search .......... 356/600–640
   See application file for complete search history.

(56) References Cited

U.S. PATENT DOCUMENTS

| | | | | |
|---|---|---|---|---|
| 3,745,830 A | * | 7/1973 | Smith, Jr. | 374/127 |
| 4,359,732 A | * | 11/1982 | Martin | 342/191 |
| 4,872,012 A | * | 10/1989 | Chabries | 342/25 A |
| 5,557,397 A | * | 9/1996 | Hyde et al. | 356/5.01 |
| 6,087,984 A | * | 7/2000 | Keller et al. | 342/357.17 |
| 6,133,867 A | * | 10/2000 | Eberwine et al. | 342/29 |
| 6,487,519 B1 | * | 11/2002 | O'Neill et al. | 702/176 |
| 6,804,608 B2 | * | 10/2004 | Lee et al. | 702/5 |
| 7,065,449 B2 | * | 6/2006 | Brewster et al. | 702/5 |
| 7,095,488 B2 | * | 8/2006 | Jamieson et al. | 356/5.01 |
| 2003/0171872 A1 | * | 9/2003 | Balasubramanian et al. | 701/223 |

FOREIGN PATENT DOCUMENTS

| | | |
|---|---|---|
| JP | A-08-179039 | 7/1996 |
| JP | A-10-318743 | 12/1998 |
| JP | A-11-006731 | 1/1999 |
| JP | A-2003-156330 | 5/2003 |

* cited by examiner

Primary Examiner—Greogory J Toatley, Jr.
Assistant Examiner—Jarreas C Underwood
(74) Attorney, Agent, or Firm—Oliff & Berridge, PLC

(57) ABSTRACT

To provide measurement data on a real time basis from a laser measurement device mounted on an air vehicle to a ground station. The laser measurement unit sequentially outputs laser measurement data during a measurement period in which the air vehicle flies along a straight line flight fairway (32). The transmission unit desirably compresses the laser measurement data when the laser measurement data is accumulated to a file size while the air vehicle flies along straight line flight fairway (32), and transmits the laser measurement data to the ground station. The transmission units does not transmit the flight state data obtained by the GPS/IMU to the ground station on the straight line flight fairway (32), but transmits during a measurement suspended period in which the air vehicle flies along a turn fairway (34).

5 Claims, 5 Drawing Sheets

N-th LASER PULSE

| TA1 | TB1 | VX1 | AX1 | VY1 | AY1 | VZ1 | AZ1 |
| TA2 | TB2 | VX2 | AX2 | VY2 | AY2 | VZ2 | AZ2 |
| TA3 | TB3 | VX3 | AX3 | VY3 | AY3 | VZ3 | AZ3 |
| TA4 | TB4 | VX4 | AX4 | VY4 | AY4 | VZ4 | AZ4 |
| TA5 | TB5 | VX5 | AX5 | VY5 | AY5 | VZ5 | AZ5 |

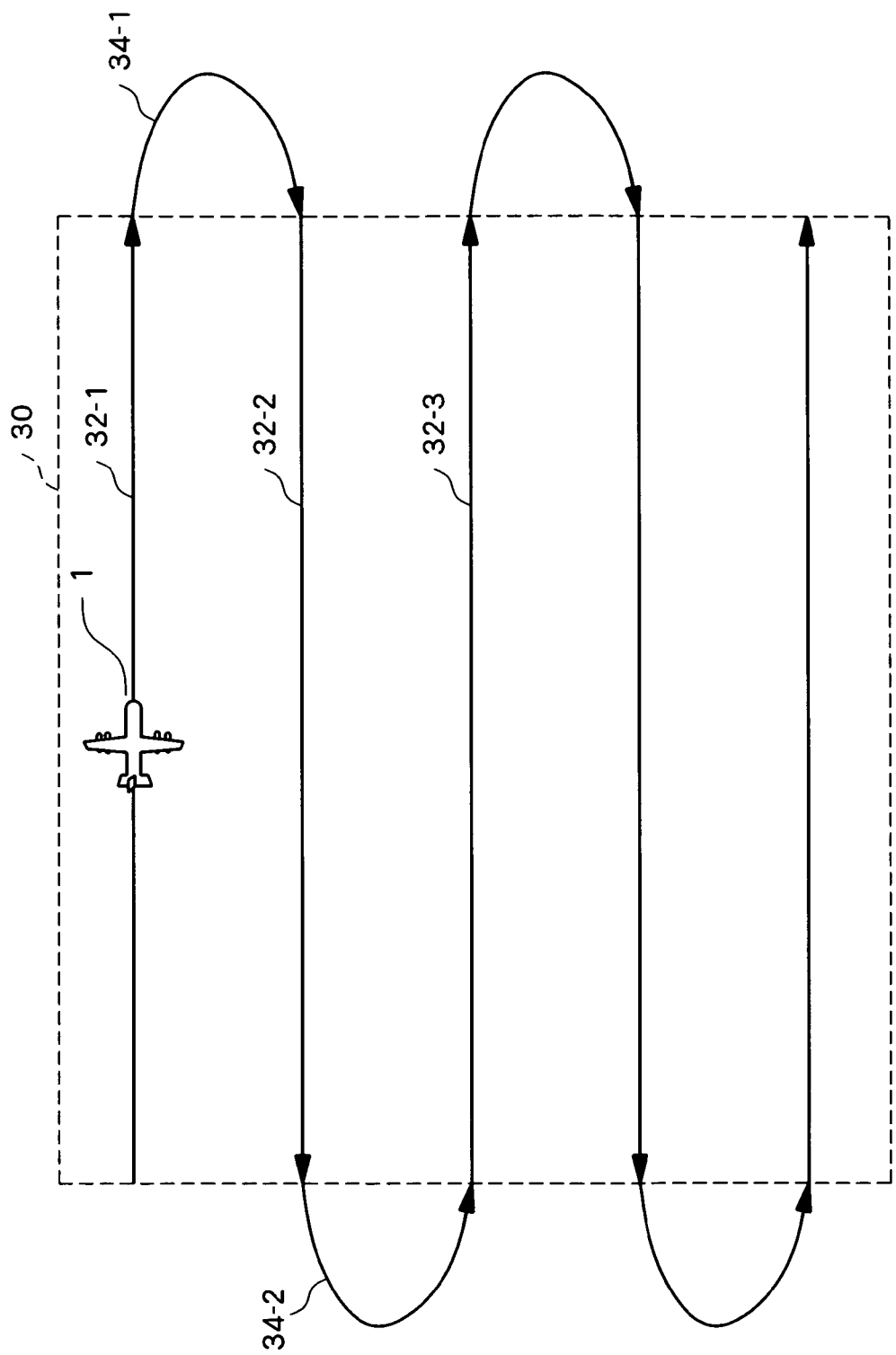

LASER MEASUREMENT DEVICE AND LASER MEASUREMENT METHOD

TECHNICAL FIELD

The present invention relates to a laser measurement device and a laser measurement method for use in measurement carried out between an air vehicle and the ground, and more particularly to transmission of measurement data from an air vehicle to a ground station.

BACKGROUND ART

As a laser measurement method for emitting a laser beam from an air vehicle such as an aircraft or the like to obtain information about concave and convex shapes on the earth's surface from the ground, there is available a method disclosed in Patent Document 1 mentioned below. In general, in such measurement using an aircraft, many laser pulses are emitted from the aircraft toward the ground because a target measurement area is relatively large and highly accurate measurement is desired. Specifically, as information about an emission time, an emission direction, and a plurality of return pulses are obtained for every laser pulse, a huge amount of data is resultantly obtained in the aircraft. According to the conventional art, the data obtained by the aircraft is stored in a data recording unit mounted in the aircraft and, after completion of the measurement, this data is transferred to a data processing device on the ground to be processed and analyzed.

However, in situations such as ascertaining the ground conditions at the time of disaster, for example, quick response capability is required. In view of the above, a laser measurement system capable of data analysis without waiting for the aircraft to land has been developed.

Patent Document 1: Japanese Patent Laid-open Publication No. 2003-156330

DISCLOSURE OF THE INVENTION

Problems to be Solved by the Invention

In order to improve the quick response capability, the huge amount of data obtained in the aircraft needs to be radio transmitted. However, efficient transmission of such a huge amount of data to the ground by utilizing limited transmission capacity is not readily achievable.

The present invention has been conceived in order to address the above-described problem, and aims to provide a laser measurement device and a laser measurement method for efficiently transmitting data obtained in an air vehicle to the ground.

Means for Solving the Problem

According to one aspect of the present invention, there is provided a laser measurement device for emitting laser pulses from an air vehicle to a ground surface in order to measure the shape of the ground surface, comprising a laser measurement unit for carrying out laser measurement, using sequentially generated laser pulses, to obtain laser measurement data for each of the laser pulses; a flight state measurement unit for obtaining flight state data containing a flight position; and a data transmission unit for radio transmission of the laser measurement data and the flight state data to a ground station, wherein the data transmission unit sequentially transmits, during a measurement period in which the laser measurement unit continues to carry out the laser measurement, the laser measurement data obtained during the measurement period, and transmits, during a measurement suspended period defined between the measurement periods, the flight state data obtained during the measurement period.

In one embodiment of the present invention, the air vehicle may scan a target measurement area while repeating straight line flight back and forth, the measurement period may be set corresponding to a period for the straight line flight, and the measurement suspended period may be set corresponding to a period for turn flight carried out between the straight line flight and subsequent straight line flight.

In another embodiment of the present invention, the data transmission unit may transmit the laser measurement data and the flight state data after accumulation of the laser measurement data and the flight state data, and the measurement period and the measurement suspended period may be discriminated from each other based on a status of the data accumulation.

According to another aspect of the present invention, there is provided a laser measurement method for emitting laser pulses from an air vehicle to a ground surface to measure a shape of the ground surface, comprising a measurement step of carrying out laser measurement using the laser pulses sequentially generated while the air vehicle carries out straight line flight above a target measurement area to obtain laser measurement data for each of the laser pulses, and of obtaining flight state data containing a flight position in parallel with acquisition of the laser measurement data; a laser measurement data transmission step of sequentially transmitting the laser measurement data obtained during a period for the straight line flight by radio to a ground station during that period; and a flight state data transmission step of transmitting by radio, during a period for turn flight in which the flying body shifts from the straight line flight above the target measurement area to following straight line flight, the flight state data obtained during a period for the preceding straight line flight, to the ground station.

EFFECT OF THE INVENTION

According to the present invention, laser measurement data, which is produced at a higher data rate than the flight state data, is sequentially processed through compression, encoding, and so forth, for example, with priority given to the flight state data, and transmitted to a ground station. Due to the higher production rate, the laser measurement data is accumulated to an amount suitable for compression and transmission in a shorter period of time. Thus, continuous processing of the laser measurement data with priority can improve efficiency in data compression in the air vehicle and in use of transmission path. Meanwhile, flight state data obtained during a measurement period is accumulated, and once a certain amount of such data is accumulated, is processed. This arrangement can ensure transmission efficiency.

BRIEF DESCRIPTION OF THE DRAWINGS

FIG. 1 is a diagram outlining a laser measurement carried out using a flight object such as an aircraft, a helicopter, or the like;

FIG. 7 is a schematic diagram explaining a transmission method for transmission from an air vehicle to a ground base station.

BEST MODE FOR CARRYING OUT THE INVENTION

In the following, an embodiment of the present invention (hereinafter referred to as an embodiment) will be described with reference to the accompanying drawings.

Figure 1:
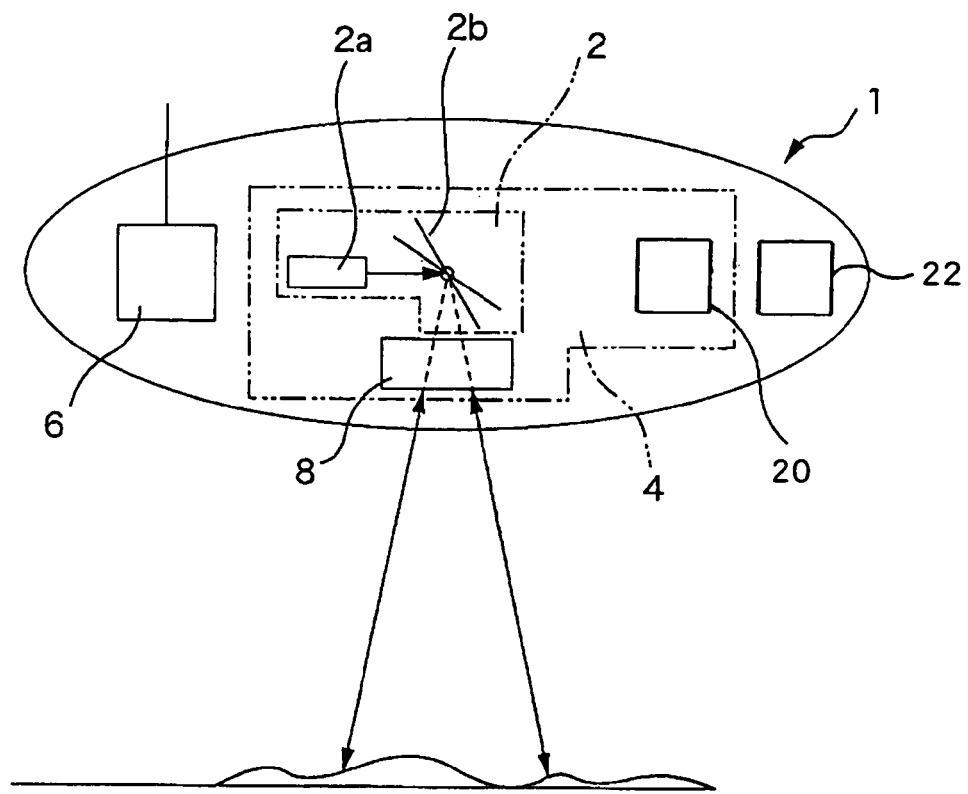

FIG. 1 is a diagram outlining laser measurement using an air vehicle such as an aircraft, a helicopter, or the like. The air vehicle 1 has a laser measurement unit 4, a GPS/IMU (Global Positioning System/Inertial Measurement Unit) 22, and a transmission unit 6, all mounted thereon. The laser measurement unit 4 comprises a laser scanner 2, a reflected wave receiving sensor 8, and a POS (Position Orientation System) 20.

The laser scanner 2 comprises a laser emitting unit 2a for emitting, under control by a control unit (not shown), laser pulses at a predetermined time interval, and a spin mirror 2b for changing, under control by a control unit (not shown), the irradiation direction of the laser pulses within a predetermined angular range for ground scanning.

The reflected wave receiving sensor 8 detects a reflected pulse (a return pulse) from the ground surface with respected to an emitted laser pulse.

The POS 20 produces a time stamp, or information about a data acquisition time.

The GPS/IMU 22 outputs information about the GPS position and inclination of the air vehicle 1 as flight state data.

The transmission unit 6 accumulates the data (laser measurement data) obtained by the laser measurement unit 4 and the data (flight state data) obtained by the GPS/IMU 22, then processes the accumulated data though compression or the like, and sends the data by radio to the ground base station.

Figure 2:
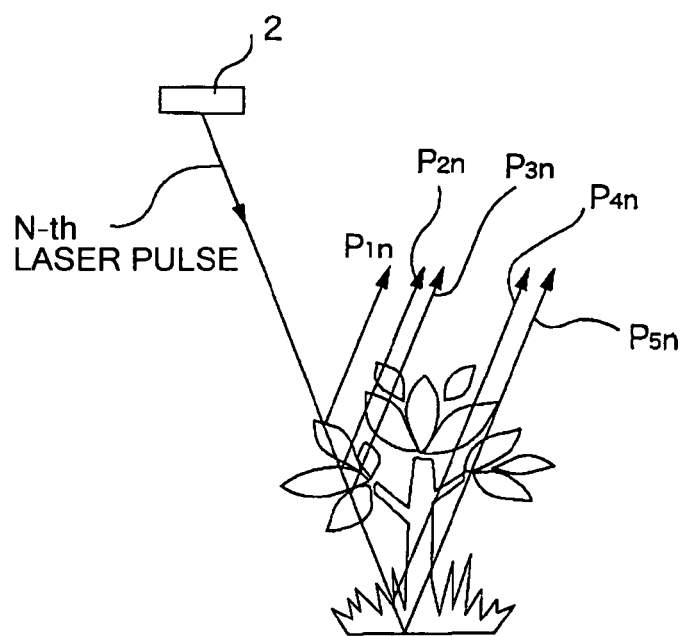
FIG. 2 is a diagram explaining a return pulse.

FIG. 2 is a diagram explaining a return pulse. Specifically, one emitted laser pulse is reflected on objects on the ground a plurality of times (generally, one to five times), so that a plurality of return pulses are accordingly detected. The reflected wave receiving sensor 8 outputs, as return pulse data Pkn, capture time information about the $k^{th}$ return pulse relative to the $n^{th}$ emitted pulse. The return pulse data Pkn describes a period of time elapsed after emission of a laser pulse, which is then reflected on the ground surface or an object on the ground, before capturing of the reflected pulse by the reflected wave receiving sensor 8.

In addition to the return pulse data Pkn, the laser measurement unit 4 obtains, as laser measurement data, emission time data Tn about a laser pulse, rotational angle data θn about the spin mirror 2b at that time, and a time stamp TSn at that time. The rotational angle data θn means an irradiation angle of a laser pulse as the irradiation direction in which the laser emitting unit 2a emits a laser pulse varies due to the spin mirror 2b.

As will be described later, in the ground base station, the distance between the air vehicle 1 and the ground surface is calculated based on the observed data comprising the return pulse data Pkn or the like, using the GPS/IMU information as a rating element, to thereby calculate the position and height of the ground surface.

It should be noted that the laser measurement data and the flight state data may be output in the form of a numeric value which is made dimensionless due to the structure of the laser measurement unit 4 or the GPS/IMU 22, and that time information, including the laser pulse emission time, return pulse data, and so forth, may be a period of time elapsed after the measurement begins, for example.

Figure 3:
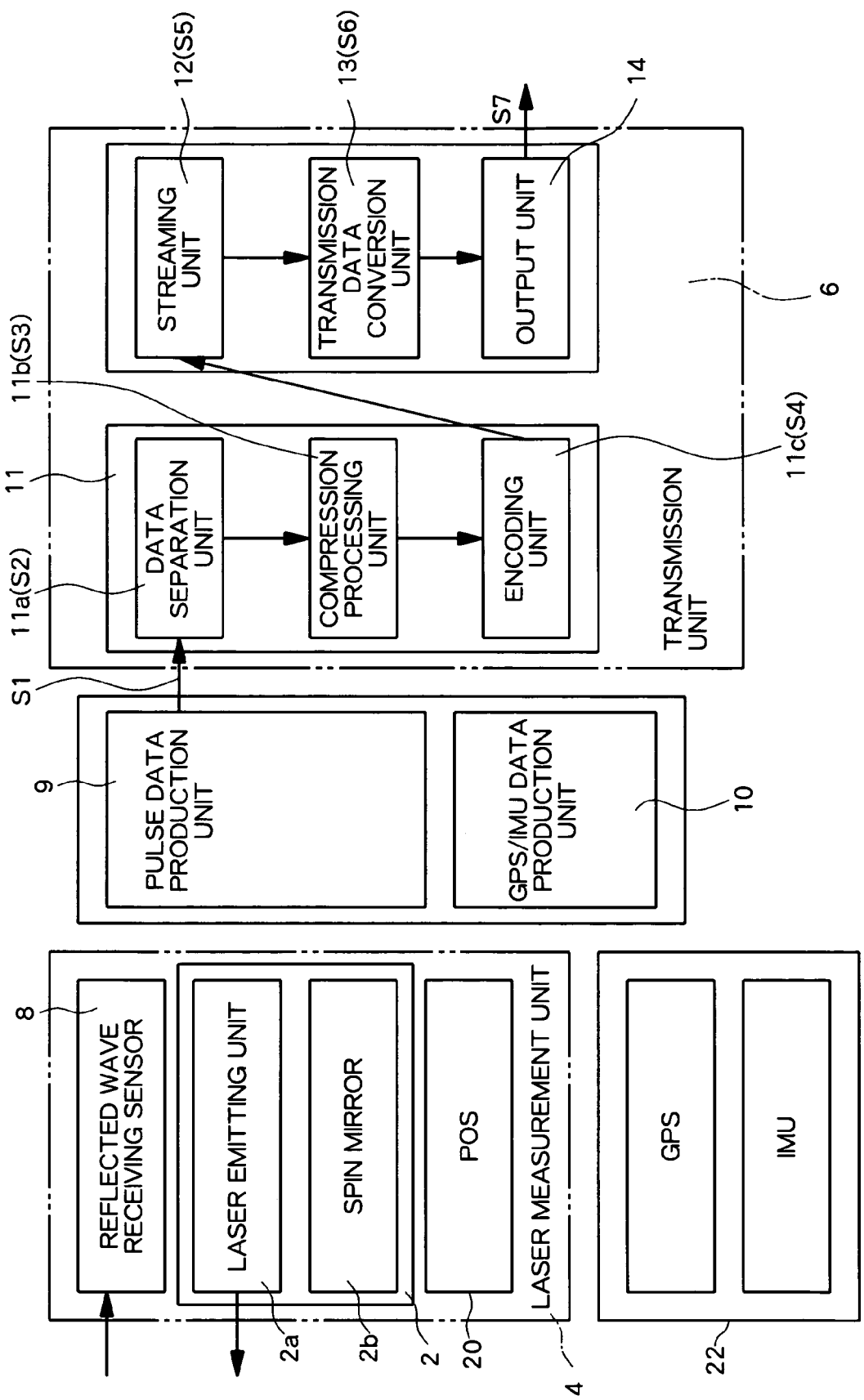
FIG. 3 is a block diagram showing a structure of a laser measurement unit, a GPS/IMU, and a transmission unit.

FIG. 3 is a block diagram showing a structure of the laser measurement unit 4, the GPS/IMU 22, and the transmission unit 6. As described above, the laser measurement unit 4 comprises the laser scanner 2, the reflected wave receiving sensor 8, and the POS 20, and outputs laser measurement data to the pulse data production unit 9. The GPS/IMU 22 outputs flight state data to the GPS/IMU data production unit 10.

Figure 4:
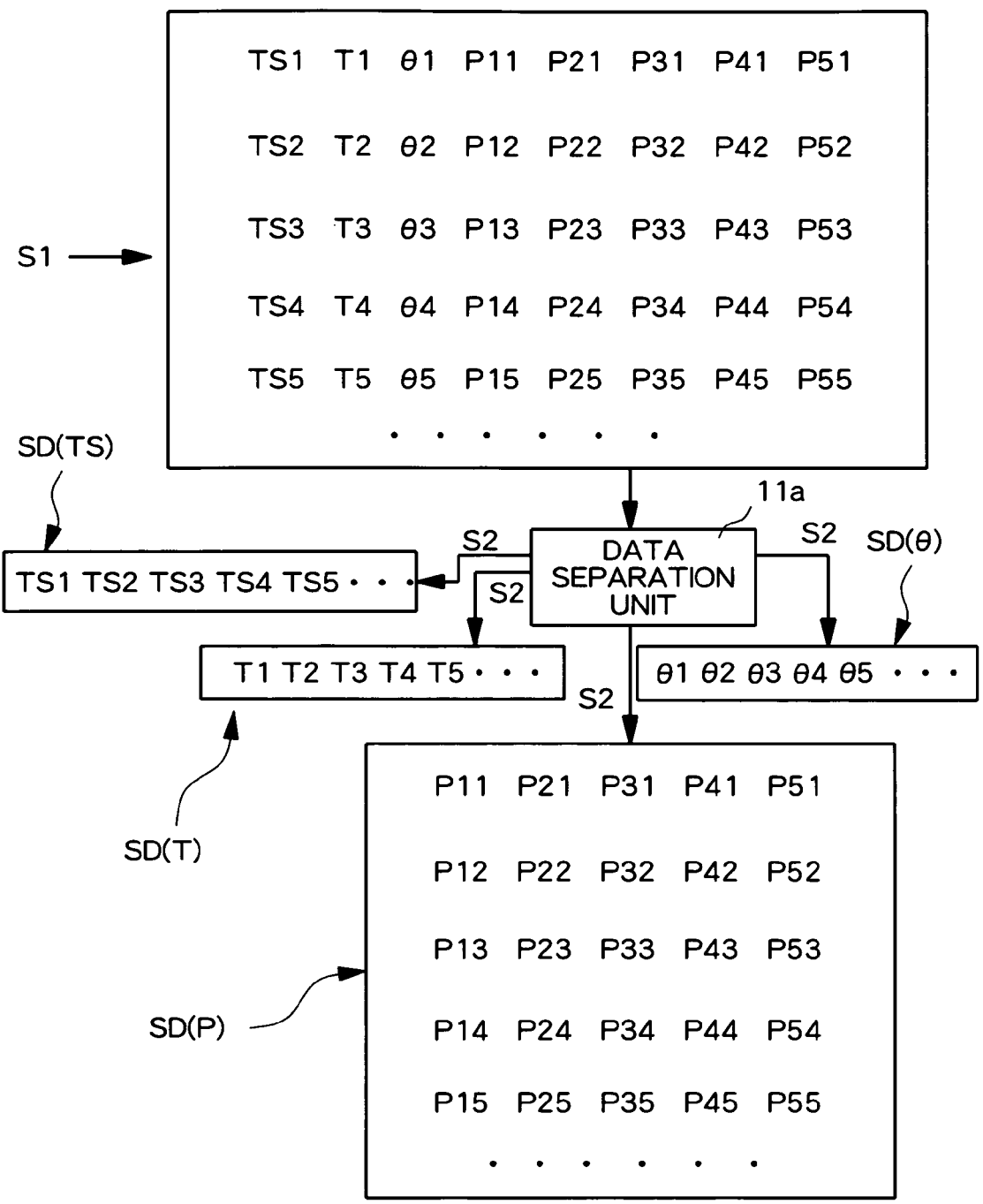
FIG. 4 is a schematic diagram showing an output format of data sent from a pulse data production unit.
Figures 5, 6:
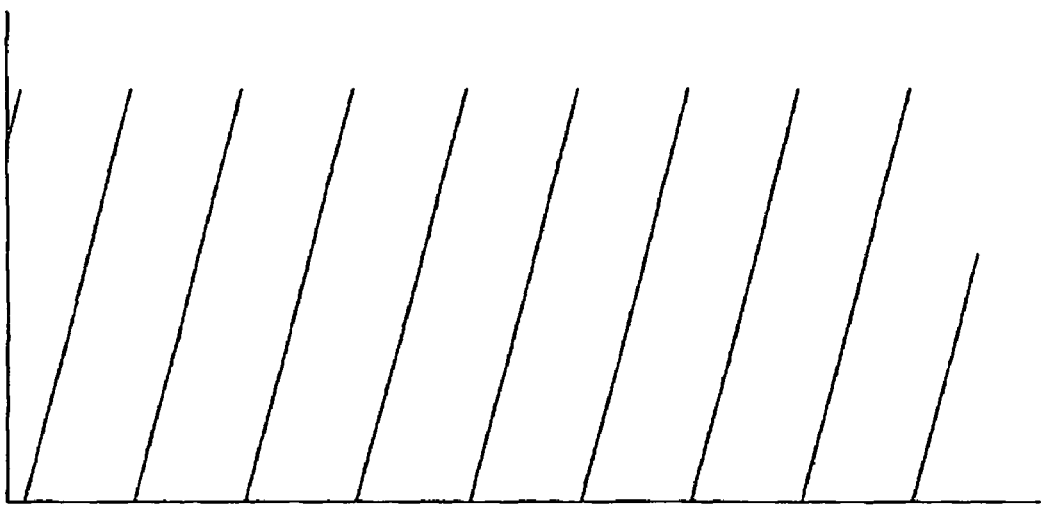
FIG. 5 is a schematic diagram showing an output format of data sent from a GPS/IMU data production unit.
FIG. 6 is a graph showing changing of laser emission time data.

FIG. 4 is a schematic diagram showing an output format of data from the pulse data production unit 9. FIG. 5 is a schematic diagram showing an output format of data from the GPS/IMU data production unit 10. As described above, the pulse data production unit 9 outputs a data string comprising output values corresponding to respective emitted pulses, in which each emission pulse (laser pulse) serves as a unit and the values are arranged in a predetermined order. The data format shown in FIG. 4 is one defined under the assumption that return pulse data Pkn up to the fifth order is obtainable relative to each emission pulse, in which time stamp TSn, laser pulse emission time data Tn, mirror rotational angle data θn, and return pulse data Pkn are stored in this order from the head of the data (FIG. 4). It should be noted that, as described above, return pulse data Pkn is not always obtained up to the fifth order, and that "0", for example, may be stored in a storage position for the order for which no return pulse data is obtained.

Meanwhile, the GPS/IMU data production unit 10 outputs GPS time TAn, IMU time TBn, x direction acceleration VXn, x direction angle AXn, y direction acceleration VYn, y direction angle AYn, z direction acceleration VZn, and z direction angle AZn, as shown in FIG. 5. Data acquiring timing for the GPS/IMU 22 is set in synchronism with, but less frequent than, the laser pulse emission timing. Then, an output value from the GPS/IMU data production unit 10 is made to correspond to the value of an output from the pulse data production unit 9 by utilizing a subscript "n" representative of a pulse number.

With the laser measurement by the air vehicle 1 begun, the data obtained by the laser measurement unit 4 and the GPS/IMU 22 is output to the pulse data production unit 9 or the GPS/IMU data production unit 10. Then, the pulse data production unit 9 and the GPS/IMU data production unit 10 produce a predetermined data string based on the data received, and outputs the data to the transmission unit 6. For example, an output from the pulse data production unit 9 is input to the compression unit 11 of the transmission unit 6 (step S1).

The compression unit 11 comprises a data separation unit 11a, a compression processing unit 11b, and an encoding unit 11c, and compresses received data. The compression is carried out on the data in a relatively small unit, such as 4M bytes or the like, for example, compared to the entire data, in order to improve immediacy.

As shown in FIG. 4, the data separation unit 11a divides the pulse data input from the pulse data production unit 9 into four kinds of data strings SD(TS), SD(T), SD(θ), and SD(P), namely, time stamp TSn, laser pulse emission time data Tn, mirror rotational angle data θn, and return pulse data Pkn (step S2), and outputs the respective divided resultant data SD to the compression processing unit 11b. As shown in FIG. 4, the time stamp TSn, the laser pulse emission time data Tn, and the mirror rotational angle data θn in the data strings SD(TS), SD (T), and SD(θ), respectively, which result from the dividing, are arranged in the pulse emission order. The return pulse data Pkn in the data string SD(P) has a format in which data groups, each comprising five data items having identical pulse emission orders and arranged in a reflection order, are arranged in the pulse emission order. A data end mark is inserted into the boundary between the data groups, when necessary, in the data SD(P).

The compression processing unit 11*b* compresses the respective data according to different algorithms, utilizing the characteristics of the respective divided resultant data strings SD (step S3).

Specifically, as the time stamp TSn output from the POS 20 has a value, in most of the cases, identical to the subordinate two digits of the mirror rotational angle data θn in this embodiment, replacement of the time stamp TSn by a difference value between the time stamp TSn and the mirror rotational angle data θn results in most of the time stamps TSn being replaced by 0. As a result, the data amount can be compressed.

FIG. 6 shows a graph showing laser emission time data changing, in which the abscissa represents a laser pulse emission order and the ordinate represents emission time. As shown, the emission time tends to be distributed, relative to the laser pulse emission order, on cyclically repeating upward-sloping straight lines. Because of this characteristic, a secondary difference value of adjacent emission time data Tn is expected to be a small value distributed in the vicinity of 0. Therefore, use of the secondary difference value enables compression of the emission time data.

In the following, compression of mirror rotational angle data θn will be described. As a line diagram concerning a laser pulse emission order and a mirror rotational angle in which the ordinate represents mirror rotational angle data θn and the abscissa represents a laser pulse emission order can be approximated by a sine curve. Then, while the smoothness of the line diagram is utilized, a secondary difference value is used as stored data. In order to be able to calculate original data values based on the respective compression values, or secondary difference values, first original data value is inserted in the beginning of the compression data, primary difference value is inserted thereafter, and secondary difference values are described thereafter.

In compressing a return pulse Pkn, as will be described below, time series primary difference values and pulse order primary difference values are obtained. That is, initially, areas for storing five return pulse data items (P1*n*, P2*n*, ..., P5*n*) are ensured with respect to one laser pulse in a data string SD(P), with "0" stored in a portion free from any return pulse data Pkn. As a number of return pulses are obtained when a laser pulse passing through the leaves of a tree in woodland or the like is reflected. on a reflective object on a ground surface or the like, as shown in FIG. 2, the possibility that return pulse data items will be stored in all areas is relatively small. Even when a small value, such as "0", is used to express "no value", an area having a predetermined bit length identical to that of where return pulse data of significant value is stored is allocated.

In order to address the data redundancy problem due to such a data structure, header information Head_n is inserted into the break point between a return pulse data group relative to the $(n-1)^{th}$ laser pulse and that relative to the $n^{th}$ laser pulse, and "value-less" data which can be present on the higher order side in the return pulse data with respect to the $n^{th}$ laser pulse is deleted. In this embodiment, a one-byte area is assigned to the header information Head_n, with five subordinate bits thereof indicating the last order and a return pulse data storage position.

Further, in the head of the return pulse data group with respect to the $n^{th}$ laser pulse, Q1*n*, or a time series primary difference value, is stored. In the above, $$Q1n = P1n - P1, n-1$$

is held. It should be noted, in the case of n=1, that P11 is stored intact. Following Q1*n*, Rkn or a pulse order primary difference value is stored. In the above, $$Rkn = Pkn - Pk-1, n$$

is held, in which k is a value in the range from two to the last order of a return pulse with respect to the $n^{th}$ laser pulse.

In the above, compression of laser measurement data output from the pulse data production unit has been described. However, the configuration may be such that flight state data output from the GPS/IMU data production unit 10 is also compressed in the compression unit 11.

With the compression of the divided resultant respective data strings SD completed, the resultant data strings SD are coupled into one file before being encoded in the encoding unit 11*c*, as shown in FIG. 3 (step S4). Entropy encoding or the like is employed for the encoding.

The completely encoded laser measurement data is subjected to streaming processing in the streaming unit 12 to be ready for analysis in a ground base station during data transmission (step S5), then subjected to carrier waveform adjustment in the transmission data conversion unit 13 (step S6), and output via the output unit 14 (step S7). The flight state data is also similarly sent via the output unit 14 to the ground base station.

It should be noted that the transmission unit 6, the pulse data production unit 9, and the GPS/IMU data production unit 10 can be realized using a computer program for causing a computer to implement these functions.

In the following, a transmission method for transmission from the air vehicle 1 to the ground base station will be described. FIG. 7 is a schematic diagram illustrating the transmission method. The measurement area 30 is scanned by a laser pulse emitted from the air vehicle 1 flying along a plurality of straight line flight fairways 32 set above the measurement area 30. The irradiation angle of the laser pulse is changed by the spin mirror 2*b* rotating so that scanning is carried out in a zigzag manner in a direction intersecting the fairway 32, using a laser pulse. Consequently, with respect to one straight line flight, a band area along the straight line flight fairway 32 is scanned by a laser pulse. The band width is determined based on the altitude of the air vehicle 1 and the rotational angular width of the spin mirror 2*b*. The plurality of straight line flight fairways 32 are defined in parallel to one another with an interval smaller than the band width of each thereof. For example, with the interval of the adjacent fairways 32 smaller than the width of the band to be scanned by the laser pulse, the scanning areas associated with adjacent fairways can overlap with each other, which can help improve the measurement accuracy.

In order to reduce the flight distance, the air vehicle 1 flies back and forth along the parallel straight line flight fairways 32 set above the measurement area 30. For example, the air vehicle 1 flies from left to right in FIG. 7 along the straight line flight fairway 32-1, then turns along the turn fairway 34-1 to enter another straight line flight fairway 32-2 from the right thereof, and flies from right to left of the fairway 32-2. Having arrived at the left end of the fairway 32-2, the air vehicle 1 turns along the turn fairway 34-2 to enter still another straight line flight fairway 32-3 from the left thereof, and flies from left to right of the fairway 32-3. As described above, the air vehicle 1 repeats straight line flight above the measurement area 30 and turn flight outside the measurement area 30, while measuring along the plurality of straight line flight fairways 32.

In the above, a period of measurement carried out using the laser measurement device is limited only to the period of straight line flight above the fairway 32, and the period with the air vehicle 1 turning along the fairway 34 is defined as a measurement suspended period. That is, the laser measurement unit 4 and the GPS/IMU 22 obtain data and send via the pulse data production unit 9 and the GPS/IMU data production unit 10 to the transmission unit 6 only during straight line flight.

Because the GPS/IMU 22 obtains data only intermittently at the laser pulse emission timings and there are many kinds of laser measurement data, the amount of laser measurement data obtained by the laser measurement unit 4 can resultantly be far larger compared to the flight state data obtained by the GPS/IMU 22. Therefore, the laser measurement data is accumulated in the transmission unit 6 faster than the flight state data. In view of the above, the transmission unit 6 processes the laser measurement data with priority during the measurement period, specifically, by occasionally compressing the received laser measurement data having been accumulated to be a predetermined file size and sending to the above described ground base station. That is, the transmission unit 6 can devote most capacity thereof to processing the laser measurement data during the measurement period, during which flight state data is not processed, and thus continuously process the laser measurement data with priority. This arrangement can improve efficiency in data compression in the flying body and in use of the transmission path.

During straight line flight, the transmission unit 6 accumulates the flight state data. The accumulated flight state data is transmitted once the flying body 1 enters the turn fairway 34 and the measurement suspended period accordingly begins. Specifically, when the measurement suspended period begins with the transmission of the laser measurement data obtained during the measurement period completed, transmission of the flight state data begins. Execution of transmission of the flight state data during the measurement suspended period, as described above, is preferable in view of the fact that, due to the amount of the flight state data, which is small, as described above, the need to process the flight state data during the measurement period is low and that the flight state data of an amount suitable for efficient compression can be ensured when being accumulated throughout a measurement period. Alternatively, the configuration may be such that the GPS/IMU 22 outputs flight state data while the air vehicle 1 flies, that is, whether or not the air vehicle 1 is in a measurement period. In such a case, an increasing amount of data is kept accumulated in the transmission unit 6, possibly reaching the file size of a process unit, also during a turn flight period. In view of the above also, processing the flight state data during a turning period, or a measurement suspended period, is preferable.

It should be noted that the transmission unit 6 determines that the air vehicle 1 has shifted from straight line flight (or a measurement period) to turn flight (or a measurement suspended period) by detecting that accumulation of laser measurement data remains suspended for a predetermined period of time, and shifts to processing of the flight state data. Alternatively, the transmission unit 6 may determine that the air vehicle 1 has shifted from turn flight (or a measurement suspended period) to straight line flight (or a measurement period) by detecting that accumulation of laser measurement data begins, and shifts to a mode for priority processing of the laser measurement data.

The ground base station receives the laser measurement data and the flight state data from the air vehicle 1, and restores the original data therefrom. Specifically, during the measurement period for the air vehicle 1, in the ground base station, the laser measurement data from the air vehicle 1 keeps being accumulated and simultaneously decoded to thereby restore data strings SD(TS), SD(T), SD($\theta$), and SD(P), which are then held in the ground base station. Further, the ground base station receives flight state data obtained during the measurement period corresponding to the aforementioned data string from the air vehicle 1 in turn flight, that is, in a measurement suspended period, then decodes the received flight state data, and combines with the laser measurement data string held in the ground base station to thereby produce ground surface shape data. Specifically, the ground base station calculates the position and height of a point where the emitted pulse is reflected to be a return pulse (a reflection point) in a predetermined projection space, utilizing an internal rating element based on the optical characteristic of the air vehicle 1 and an external rating element based on the GPS/IMU data obtained as the flight state data. It should be noted that as the number of data items sent from the GPS/IMU is generally small compared to the number of emitted laser pulses, one-to-one correspondence is not available. Therefore, an interpolation value obtained based on the obtained GPS/IMU data is used as an external rating element for laser data other than the laser data corresponding to the subscript "n", as described above.

As the thus obtained point data has three dimensional information, the ground surface can be drawn in dots, using the point data. Moreover, the ground base station can form a 3D image having a 3D polygon, texture, and so forth, for example, based on the calculated point data group.

Here, the ground base station may have a comparison unit in order to quickly obtain information at the time of diastrophism, disaster, and so forth, by utilizing the capability thereof for quick response. Specifically, the comparison unit compares the newly obtained 3D image data and the existing 3D image data to detect a difference between the images. The detected result can be shown on a display unit in the ground base station, and re-measurement and/or enlargement of a target measurement area can be instructed to the air vehicle 1 flying above, when necessary.

The invention claimed is:

1. A laser measurement device for emitting laser pulses from an air vehicle to a ground surface to measure a shape of the ground surface, comprising:
    a laser measurement unit for carrying out laser measurement using the laser pulses sequentially generated to obtain laser measurement data for each of the laser pulses;
    a flight state measurement unit for obtaining flight state data containing a flight position; and
    a data transmission unit for transmitting by radio the laser measurement data and the flight state data to a ground station;
    wherein
    the data transmission unit is configured to sequentially transmit, during a measurement period in which the laser measurement unit keeps carrying out the laser measurement, the laser measurement data obtained during the measurement period, and transmit, during a measurement suspended period defined between the measurement periods, the flight state data obtained during the measurement period.

2. The laser measurement device according to claim 1, wherein
    the air vehicle scans a target measurement area while repeating straight line flight back and forth, the measurement period is set corresponding to a period for the straight line flight, and the measurement suspended period is set corresponding to a period for turn flight carried out between the straight line flight and following straight line flight.

3. The laser measurement device according to claim 1, wherein the data transmission unit transmits the laser measurement data and the flight state data after accumulation of the laser measurement data and the flight state data, and the measurement period and the measurement suspended period are discriminated from each other based on a status of the data accumulation.

4. The laser measurement device according to claim 2, wherein the data transmission unit transmits the laser measurement data and the flight state data after accumulation of the laser measurement data and the flight state data, and the measurement period and the measurement suspended period are discriminated from each other based on a status of the data accumulation.

5. A laser measurement method for emitting laser pulse from an air vehicle to a ground surface to measure a shape of the ground surface, comprising:

a measurement step of carrying out laser measurement using the laser pulses sequentially generated while the air vehicle carries out straight line flight above a target measurement area to obtain laser measurement data for each of the laser pulses, and of obtaining flight state data containing a flight position in parallel to acquisition of the laser measurement data;

a laser measurement data transmission step of sequentially transmitting the laser measurement data obtained during a period for the straight line flight by radio to a ground station during that period; and a flight state data transmission step of transmitting, by radio during a period for turn flight in which the flying body shifts from the straight line flight above the target measurement area to following straight line flight, the flight state data obtained during a period for the preceding straight line flight to the ground station.

* * * * *